Oct. 4, 1927.
C. F. JENKINS
1,644,383
PLURAL LENS DISK ANALYZER
Original Filed June 20, 1925
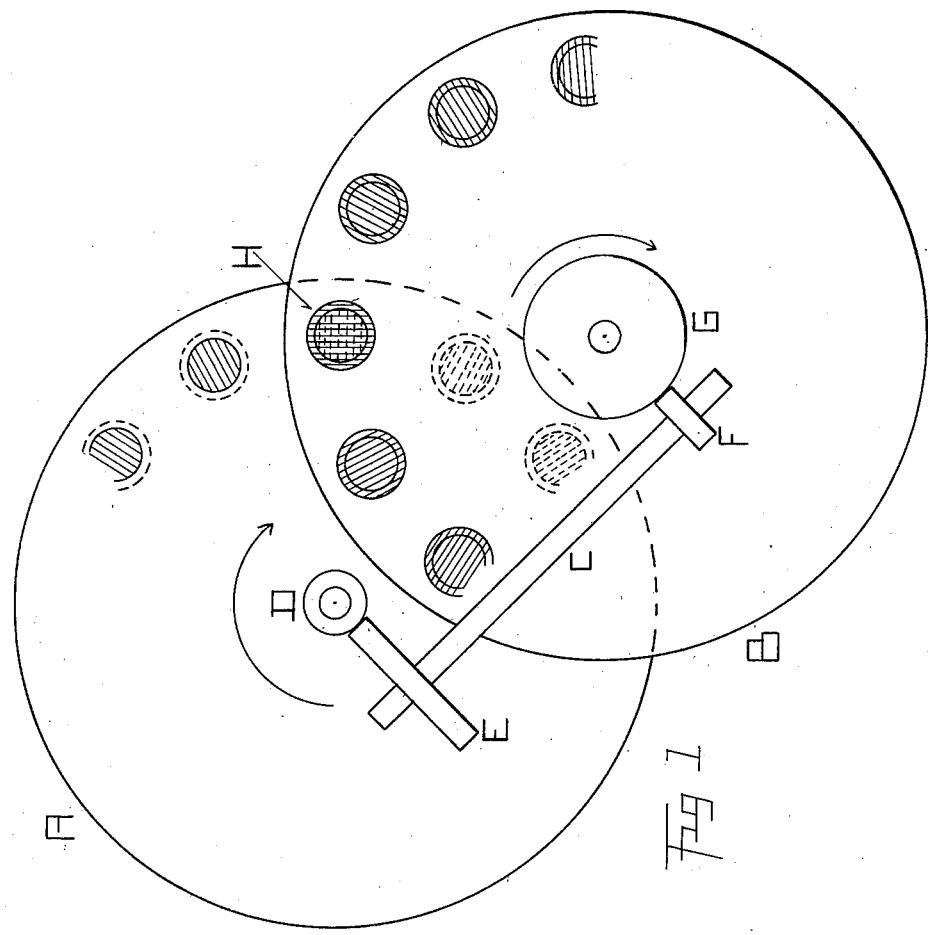
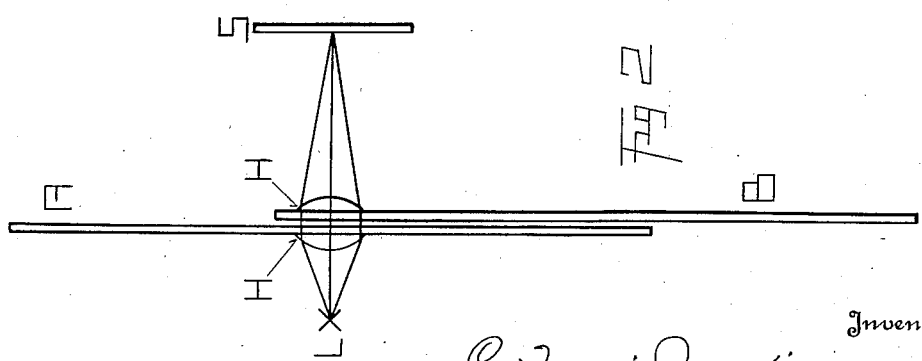

Patented Oct. 4, 1927.

1,644,383

UNITED STATES PATENT OFFICE.

CHARLES FRANCIS JENKINS, OF WASHINGTON, DISTRICT OF COLUMBIA.

PLURAL LENS-DISK ANALYZER.

Application filed June 20, 1925, Serial No. 38,560. Renewed September 18, 1926.

This invention relates to apparatus for transmitting motion pictures by radio, and has for its principal object means for scanning a flat picture surface at a speed within the persistence-of-vision range, say fifteen or sixteen times per second.

As is well known the accepted method of analyzing a picture surface is to traverse it in a plurality of parallel, adjacent lines, and this apparatus is intended to provide a speedy mechanism for this purpose.

With this and other objects in view the invention consists in the novel details of assembly of the various elements employed, hereinafter disclosed, and particularly pointed out in the claims.

The drawings are schematic, and in which Fig. 1 is a front elevation, and Fig. 2 an edge view. In the figures like symbols refer to like parts; A being a "fast" disk for scanning the picture surface in lines, and B a slow disk for displacing the lines to cover the whole picture area. The disks are connected by a shaft C and gears D, E, F and G, to make disk A rotate a plurality of times to each revolution of disk B.

The disks have perforations in them. over each of which a lens H is mounted. These lenses are shown as cylindrical lenses, the axis of each cylinder being radial of the disk on which it is mounted.

The disks are so located that the lenses overlap each other at a point (H) on the diameters of the two disks, the diameters being at right angles where the lenses overlap, i. e., at H.

A suitable light source L (Fig. 2) is located in the optical axis of the overlapping lenses H. to be focused on the screen S. (In Fig. 1 the light would be located in a line perpendicular to the paper.)

If, therefore, disk A is moved, the image of the light moves. If this movement is rapid enough, the eye-effect is an apparent line of light on the screen S. But because the connecting gearing slowly moves the other half of lens H, i. e., the half on the slow-moving disk, then successive lines are displaced and the picture area is ultimately covered with parallel, adjacent lines, which is the principal object of this invention.

Therefore, if the light source were modulated by any accepted method it would be possible to build up a picture, but as this is not a part of this invention it probably does not need to be here described or illustrated.

As other than cylindrical lenses can be used more or less successfully, I do not, of course, wish to be confined to cylindrical lenses.

What I claim, is—

1. The combination of a lens-carrier, having a plurality of like lenses thereon, of a second similar lens-carrier, also with a plurality of like lenses thereon, and means for passing the lenses of one carrier across the line of travel of the lenses of the other carrier, one lens-carrier rotating a plurality of times to a single rotation of the other lens-carrier.

2. The combination of a lens-carrier, having a plurality of like lenses thereon, of a second similar lens-carrier, also with a plurality of like lenses thereon, and means for passing the lenses of one carrier across the line of travel of the lenses of the other carrier at approximately right angles thereto.

3. The combination of a lens-carrier, having a plurality of like cylindrical lenses thereon, of a second similar lens-carrier, also with a plurality of like cylindrical lenses thereon, and means for passing the lenses of one carrier across the line of travel of the lenses of the other carrier at approximately right angles thereto.

4. The combination of a lens, means to cause said lens to cross a certain line repeatedly at a given rate, a second lens, and means to cause said second lens to cross said line repeatedly at a different rate.

5. The combination of a lens, means to cause said lens to cross a certain line repeatedly at a given rate, a second lens, and means to cause said second lens to cross said line repeatedly and at approximately right angles to the first lens.

In testimony whereof I have affixed my signature.

CHARLES FRANCIS JENKINS.